(12) United States Patent
Shin et al.

(10) Patent No.: US 12,092,949 B2
(45) Date of Patent: Sep. 17, 2024

(54) LENS MOVING APPARATUS, AND CAMERA MODULE AND PORTABLE DEVICE INCLUDING SAME

(71) Applicant: LG INNOTEK CO., LTD., Seoul (KR)

(72) Inventors: Seung Taek Shin, Seoul (KR); Jin Suk Han, Seoul (KR); Tae Bong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/298,699

(22) Filed: Apr. 11, 2023

(65) Prior Publication Data

US 2023/0244122 A1 Aug. 3, 2023

Related U.S. Application Data

(63) Continuation of application No. 17/093,052, filed on Nov. 9, 2020, now Pat. No. 11,662,648, which is a
(Continued)

(30) Foreign Application Priority Data

Jun. 30, 2015 (KR) .......................... 10-2015-0092714
Aug. 6, 2015 (KR) .......................... 10-2015-0110871

(51) Int. Cl.
*G03B 5/00* (2021.01)
*G02B 7/08* (2021.01)
(Continued)

(52) U.S. Cl.
CPC ................. *G03B 5/00* (2013.01); *G02B 7/08* (2013.01); *G02B 7/09* (2013.01); *G02B 27/646* (2013.01);
(Continued)

(58) Field of Classification Search
CPC .......... G02B 7/08; G02B 7/09; G02B 27/646; G03B 5/00; G03B 13/36;
(Continued)

(56) References Cited

FOREIGN PATENT DOCUMENTS

| JP | 2013-97374 A | 5/2013 |
|---|---|---|
| KR | 10-2007-0082097 A | 8/2007 |

(Continued)

OTHER PUBLICATIONS

International Search Report in International Application No. PCT/KR2016/007006, filed Jun. 30, 2016.
(Continued)

*Primary Examiner* — Joseph P Martinez
*Assistant Examiner* — Grant A Gagnon
(74) *Attorney, Agent, or Firm* — Saliwanchik, Lloyd & Eisenschenk

(57) ABSTRACT

One embodiment of a lens driving device comprises: a housing supporting a first magnet; a bobbin provided on the inside of the first magnet, provided with a first coil on an outer peripheral surface thereof, and moving within the housing; a base disposed at the bottom of the bobbin; an upper elastic member provided at the top of the bobbin; and a supporting member disposed on a side surface of the housing, and having the bottom thereof coupled to the base, wherein a portion of the top of the supporting member may be coupled to the upper elastic member.

20 Claims, 16 Drawing Sheets

Related U.S. Application Data continuation of application No. 15/741,114, filed as application No. PCT/KR2016/007006 on Jun. 30, 2016, now Pat. No. 10,859,890.

(51) Int. Cl.
- *G02B 7/09* (2021.01)
- *G02B 27/64* (2006.01)
- *G03B 13/36* (2021.01)
- *H02K 41/035* (2006.01)
- *H04N 23/57* (2023.01)
- *H04N 23/63* (2023.01)
- *H04N 23/68* (2023.01)

(52) U.S. Cl.
CPC ......... *G03B 13/36* (2013.01); *H02K 41/0356* (2013.01); *H04N 23/57* (2023.01); *H04N 23/63* (2023.01); *H04N 23/687* (2023.01); *G03B 2205/0007* (2013.01); *G03B 2205/0069* (2013.01)

(58) Field of Classification Search
CPC .... G03B 2205/0007; G03B 2205/0069; H04N 23/63; H04N 23/687; H04N 23/57; H02K 41/0356

USPC ......................................................... 359/557

See application file for complete search history.

(56) References Cited

FOREIGN PATENT DOCUMENTS

| | | |
|---|---|---|
| KR | 10-2012-0097122 A | 9/2012 |
| KR | 10-2014-0076329 A | 6/2014 |
| KR | 10-2014-0140329 A | 12/2014 |
| KR | 10-2015-0042681 A | 4/2015 |
| KR | 10-2015-0064987 A | 6/2015 |
| KR | 10-2015-0089648 A | 8/2015 |
| WO | 2010/068048 A2 | 6/2010 |

OTHER PUBLICATIONS

Notice of Allowance dated Aug. 10, 2020 in U.S. Appl. No. 15/741,114.

Office Action dated Sep. 10, 2021 in Korean Application No. 10-2015-0092714.

Office Action dated Mar. 8, 2022 in Korean Application No. 10-2015-0110871.

【FIG. 1】
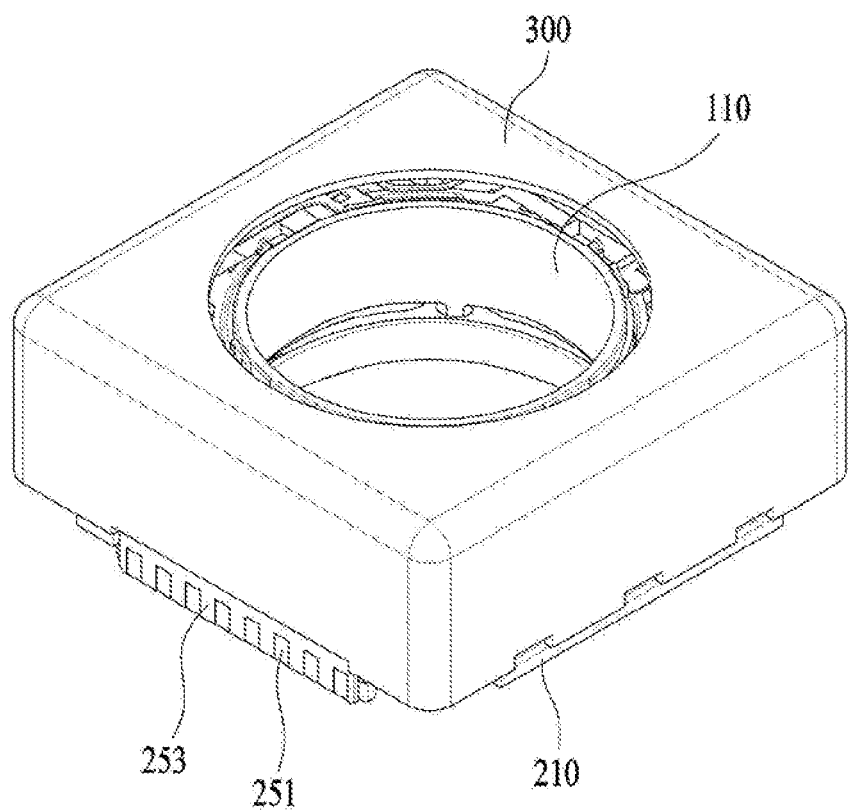

【FIG. 2】
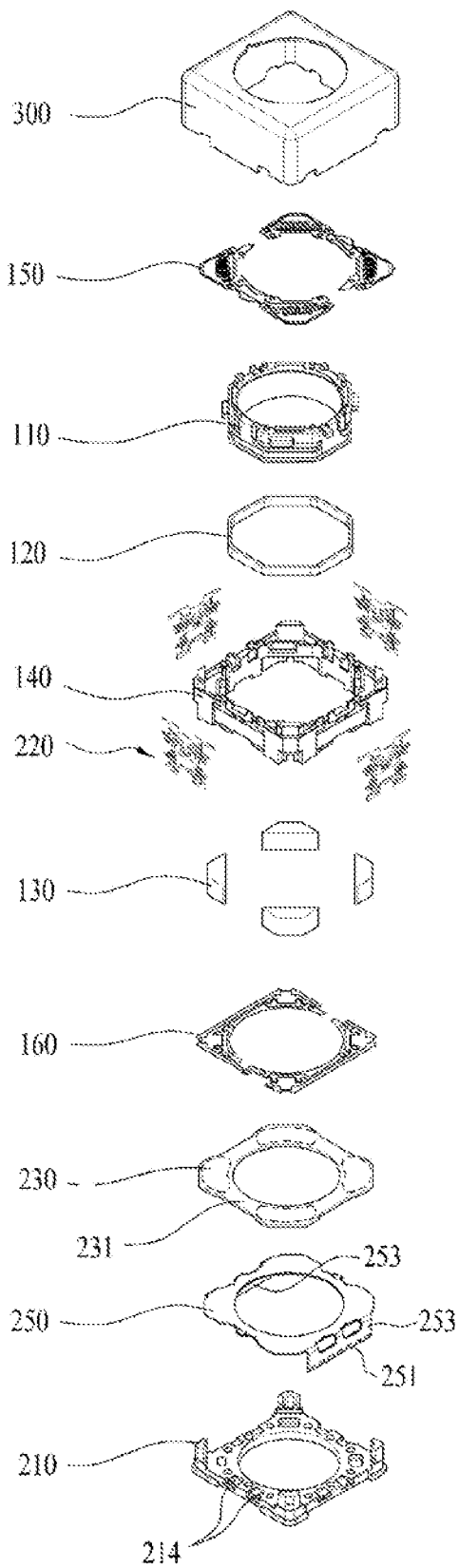

[FIG. 3]
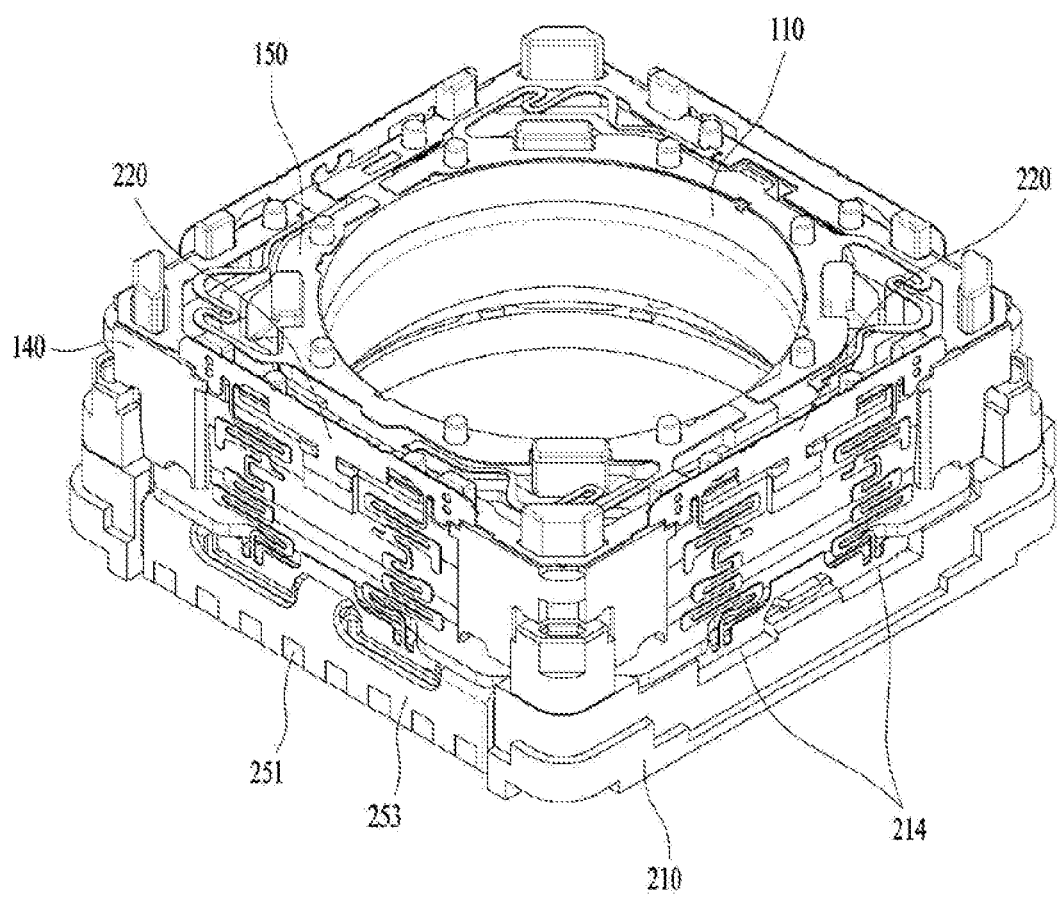

[FIG. 4]
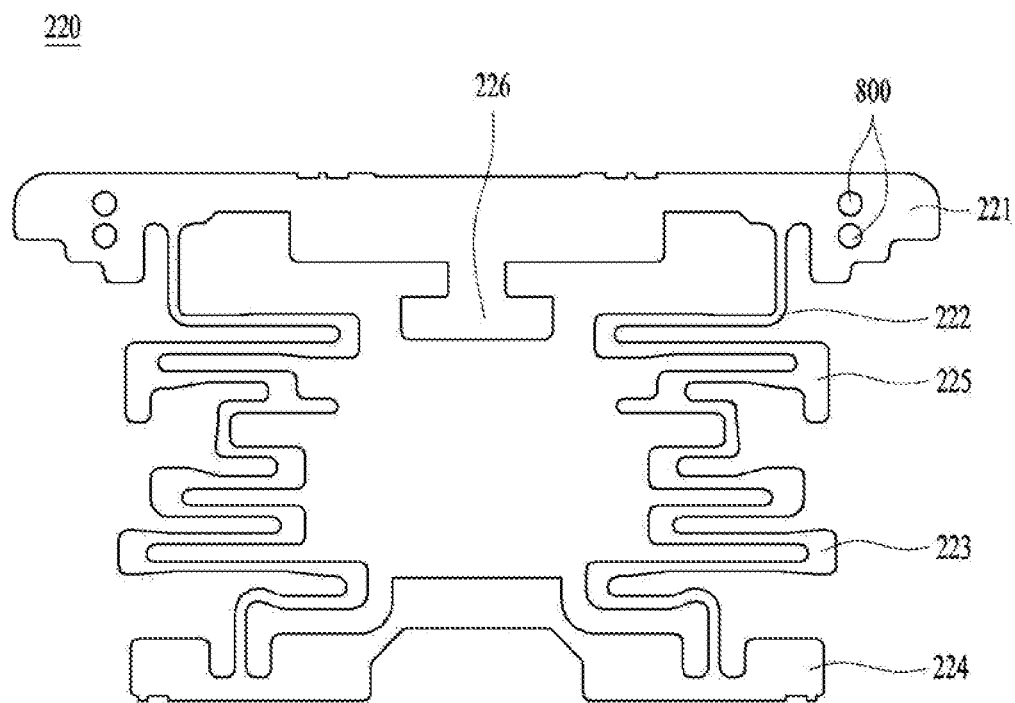

[FIG. 5]
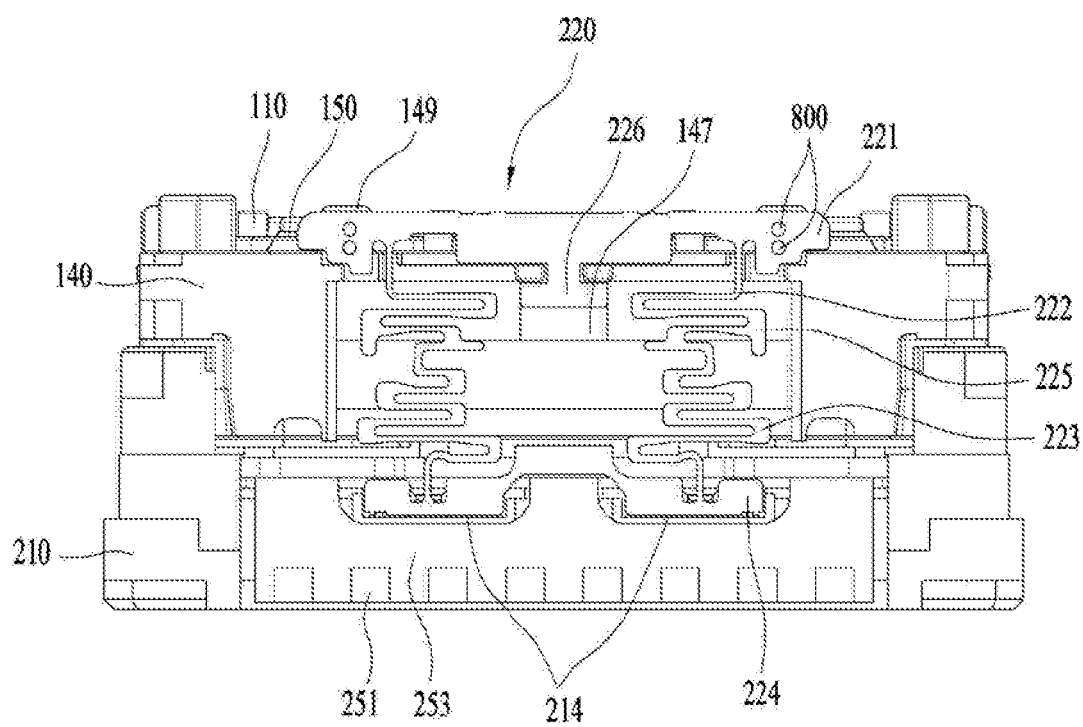

[FIG. 6]
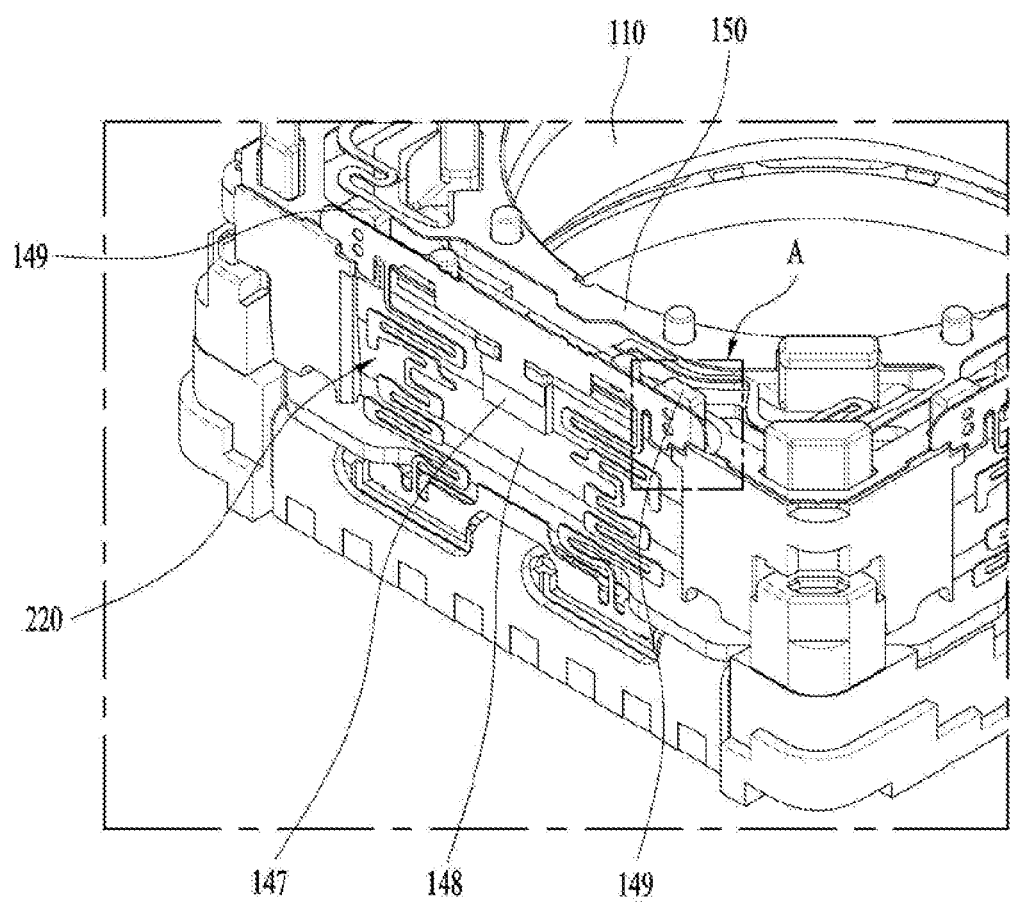

[FIG. 7]
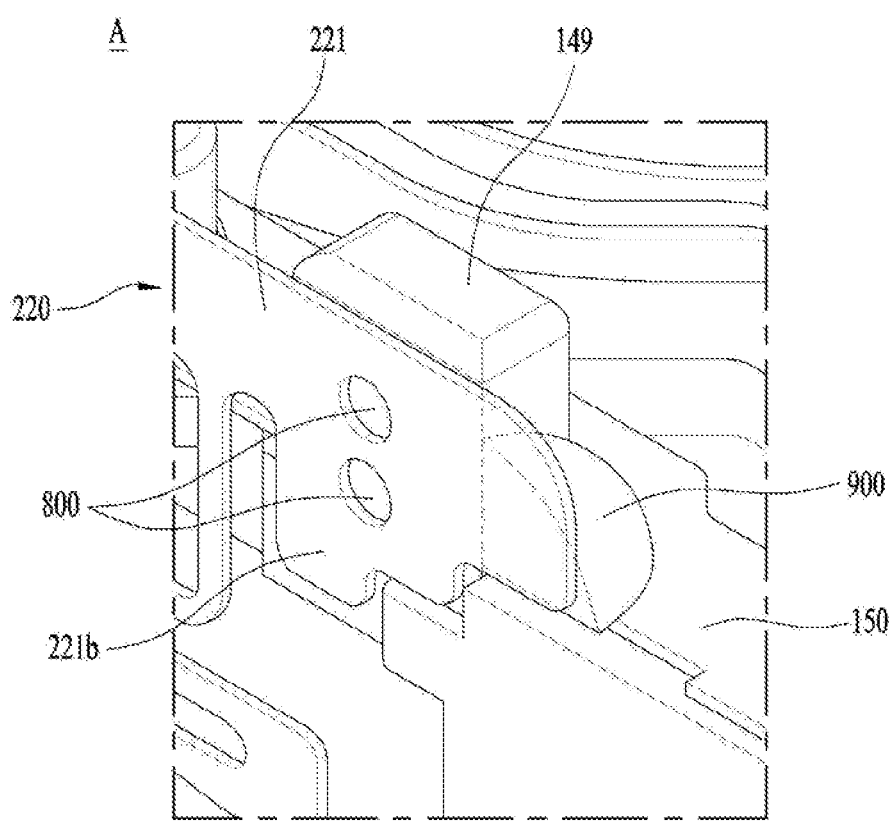

[FIG. 8]
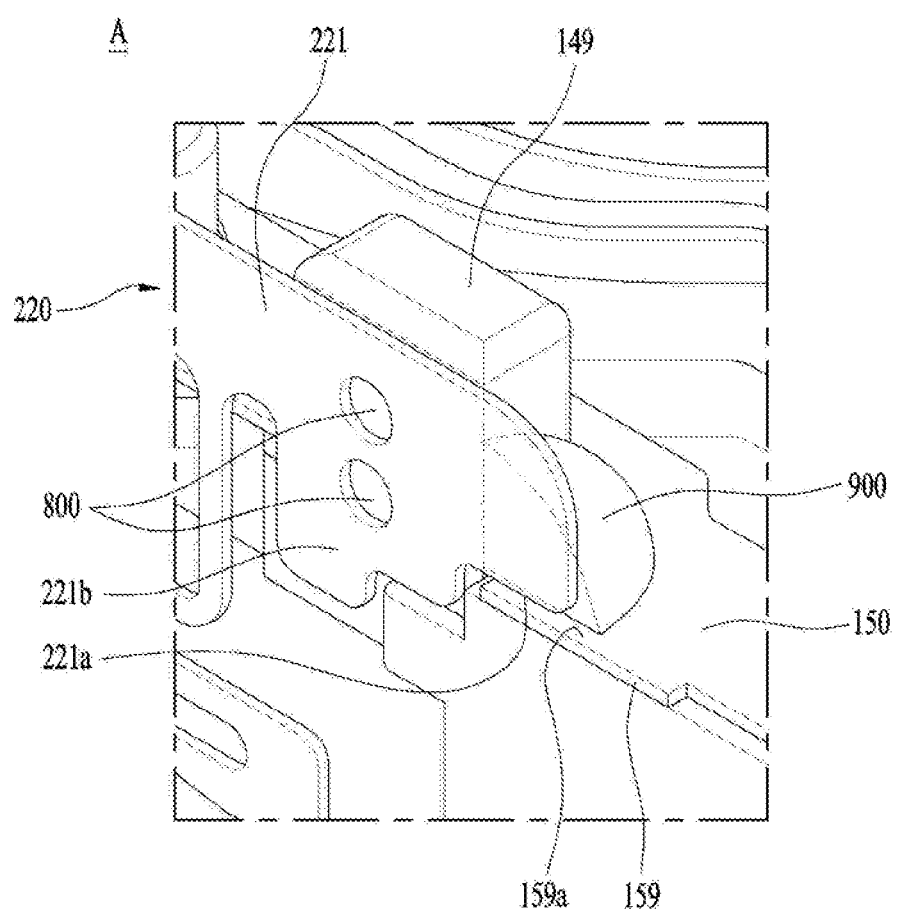

[FIG. 9]
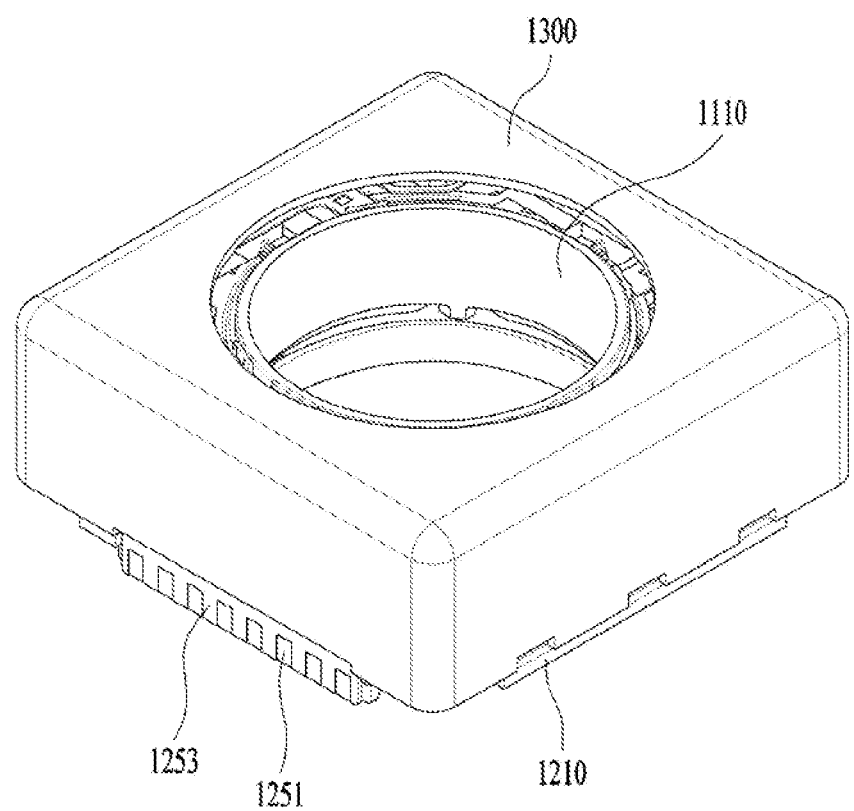

[FIG. 10]
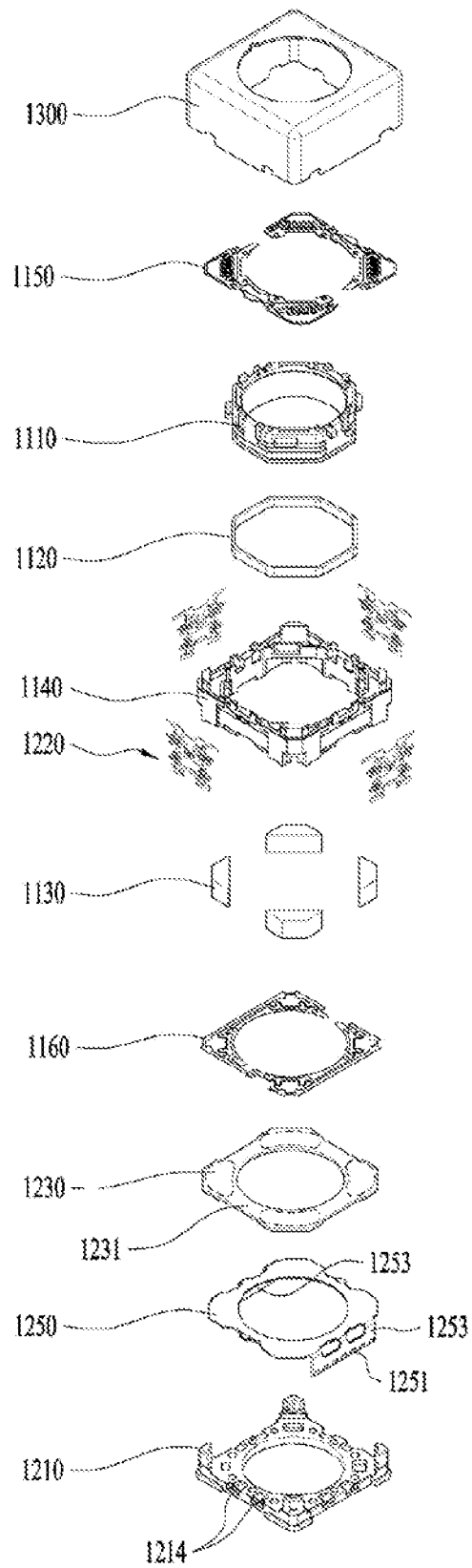

【FIG. 11】
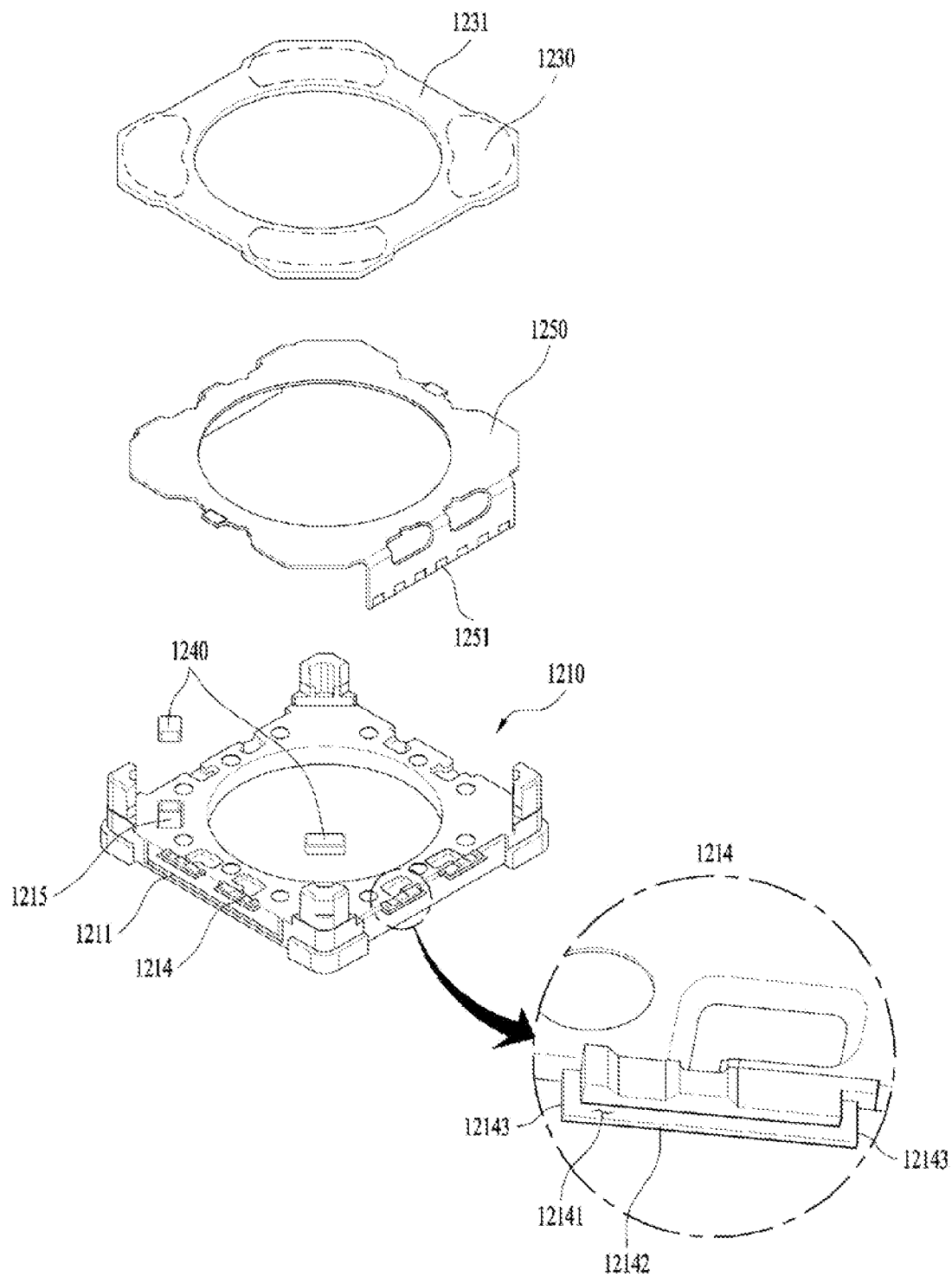

[FIG. 12a]
1214
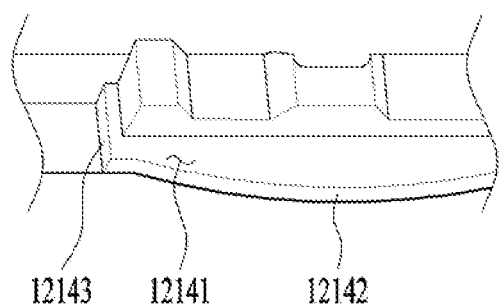
12143   12141   12142
[FIG. 12b]
1214
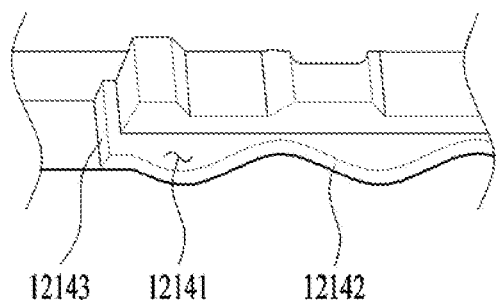
12143   12141   12142

[FIG. 13a]
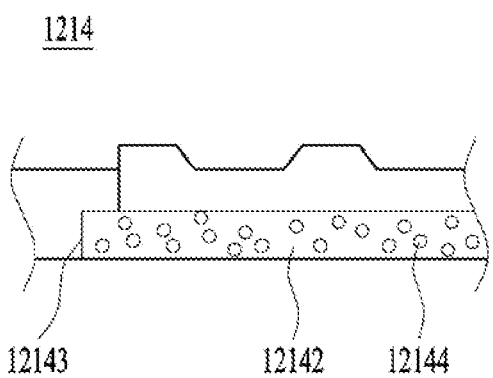
[FIG. 13b]
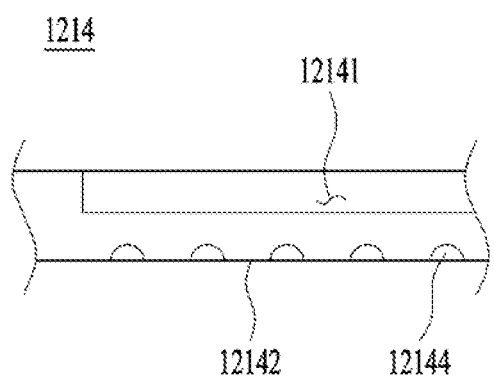

[FIG. 14]
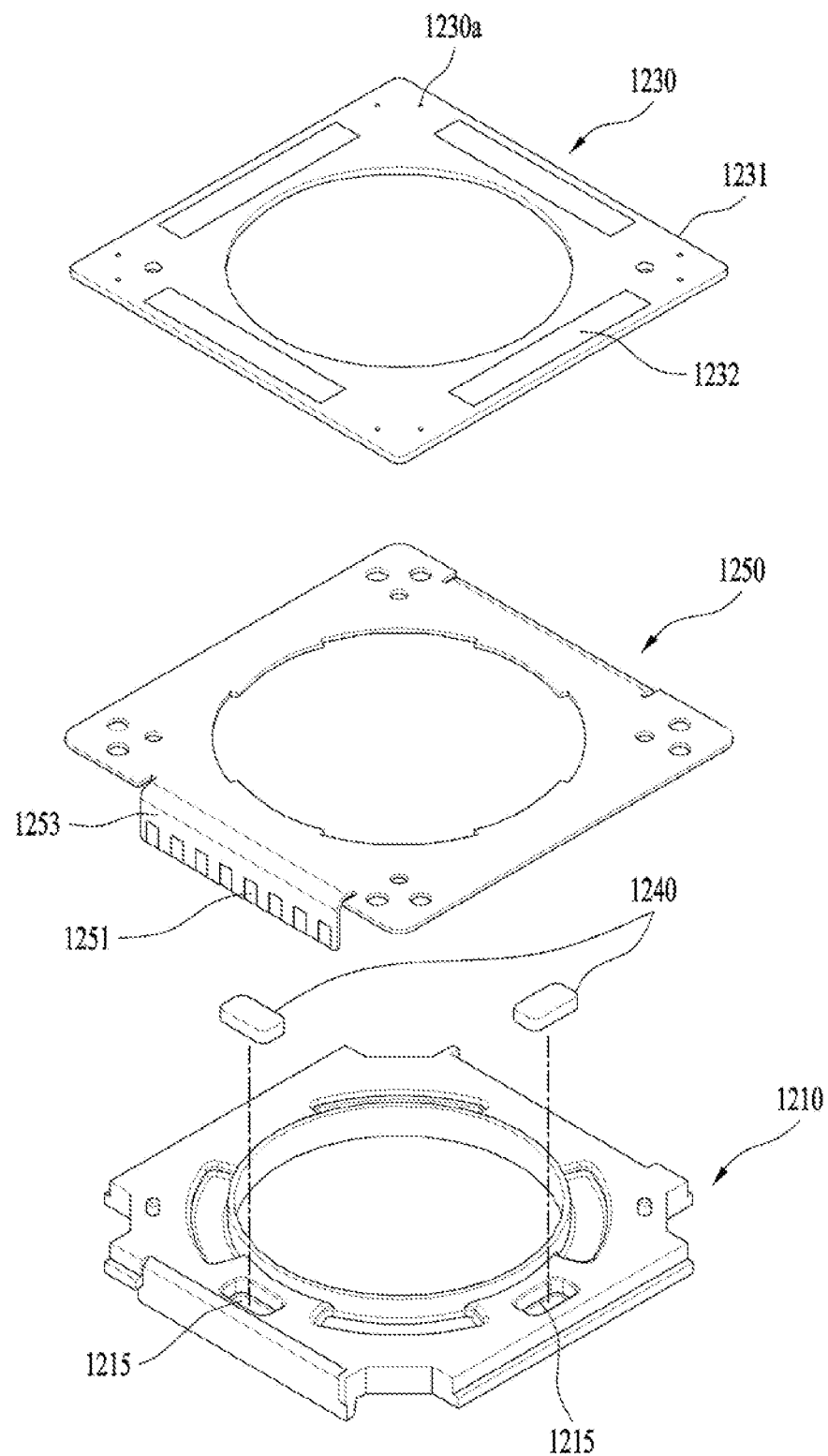

[FIG. 15]
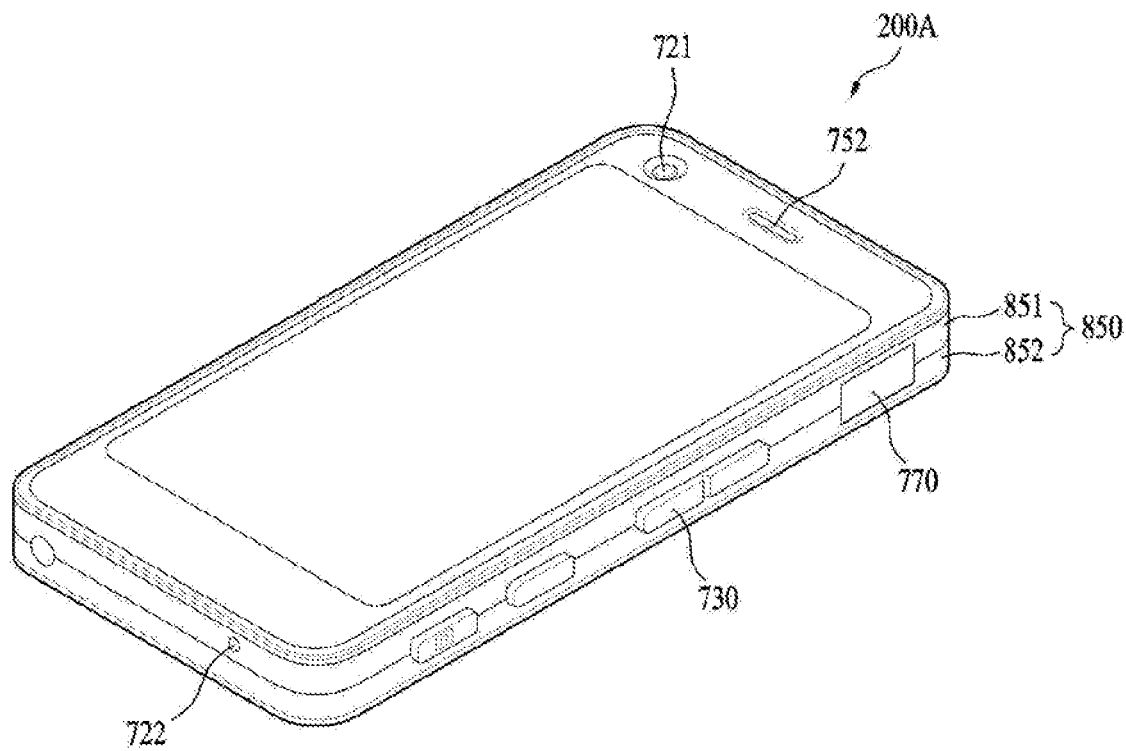

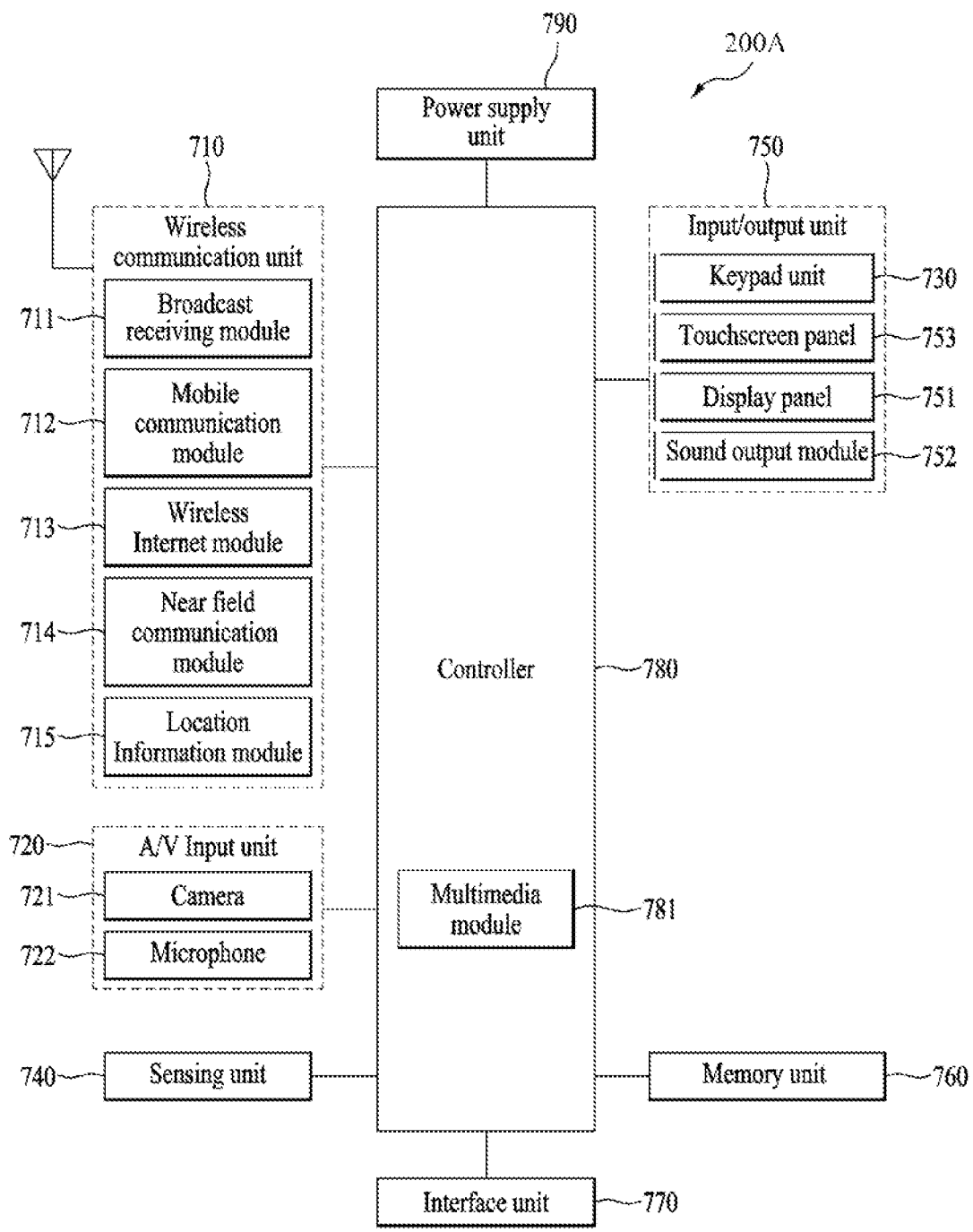
[FIG. 16]

LENS MOVING APPARATUS, AND CAMERA MODULE AND PORTABLE DEVICE INCLUDING SAME

CROSS-REFERENCE TO RELATED APPLICATIONS

This application is a continuation of U.S. application Ser. No. 17/093,052, filed Nov. 9, 2020; which is a continuation of U.S. application Ser. No. 15/741,114, filed Dec. 29, 2017, now U.S. Pat. No. 10,859,890, issued Dec. 8, 2020; which is the U.S. national stage application of International Patent Application No. PCT/KR2016/007006, filed Jun. 30, 2016; which claims priority to Korean Application Nos. 10-2015-0092714, filed Jun. 30, 2015; and 10-2015-0110871, filed Aug. 6, 2015; all of which are incorporated herein by reference in their entirety.

TECHNICAL FIELD

Embodiments relate to a lens moving apparatus, a camera module including the lens moving apparatus and a portable device including the lens moving apparatus.

BACKGROUND ART

The disclosure of this section is intended to merely provide background information relating to the embodiments and does not necessarily constitute the related art.

Recently, information technology products such as cellular phones, smart phones, tablet PCs and notebook PCs, in which ultracompact digital cameras are incorporated, are being actively developed.

A camera module mounted in a small-sized electronic product, such as a smart phone, may be frequently subjected to shocks during use. In addition, the camera module may minutely shake due to the trembling of a user's hand while taking a photography. Therefore, there is an urgent necessity for technology capable of installing an optical image stabilizer in the camera module.

When a device, an element or the like, which is required to realize such handshake correction, is subjected to external shocks, the component may be separated from a camera module or a lens moving apparatus included in the camera module, thereby causing breakage, malfunction or the like of the camera module. Accordingly, there is a need to mend the problem.

It is difficult to adopt voice coil motor (VCM) technology, which is typically used in conventional camera modules, for use in an ultracompact camera module, which aims at achieving low power consumption, and thus research regarding the technology has been actively undertaken.

A lens moving apparatus of a camera module may include a base and a printed circuit board for controlling the base. The printed circuit board of the les moving apparatus of the camera module may be bent by 90 degrees at opposite ends thereof, and may be attached to the base. Here, there is a problem in that the printed circuit board is raised up from the base during the attachment procedure.

In addition, when an adhesive member is provided on surfaces of the printed circuit board and the base that come into contact with each other in a surface-contact manner, to overcome this problem, there is an additional problem in that the adhesive member flows into a mounting recess during the attachment between the printed circuit board and the base.

Technical Object

Accordingly, embodiments relate to a lens moving apparatus in which a device, parts and the like for fulfilling a handshake correction function are firmly coupled with each other, and a camera module including the lens moving apparatus.

An object of the embodiments is to provide a lens moving apparatus designed to inhibit a printed circuit board from being raised up from a base, and a camera module including the lens moving apparatus.

In addition, another object of the embodiments is to provide a lens moving apparatus, which is provided with a base including a stepped portion for accommodating an adhesive member leaking from between a printed circuit board and the base in a procedure of attaching the printed circuit board to the base, and a camera module including the lens moving apparatus.

The technical goal to be accomplished by the embodiments is not limited to the above-mentioned technical goal, and other technical goals, which are not mentioned above, will be apparently understood by one of ordinary skill in the art to which the embodiments belong.

Technical Solution

An embodiment of a lens moving apparatus includes a housing for supporting a first magnet, a bobbin disposed in the first magnet and provided at an outer circumferential surface thereof with a first coil, the bobbin moving in the housing, a base disposed under the bobbin, an upper elastic member disposed on the bobbin, and a support member disposed at a lateral side surface of the housing and coupled at a lower side thereof to the base, wherein a portion of an upper side of the support member is coupled with the upper elastic member.

Another embodiment of a lens moving apparatus includes a first lens drive unit including a bobbin which is provided therein with at least one lens and is provided on an outer circumferential surface thereof with a first coil, a first magnet disposed around the bobbin so as to face the first coil, a housing for supporting the first magnet, and upper and lower elastic members, coupled with the bobbin and the housing, so as to move the bobbin in a first direction parallel to an optical axis by interaction between the first magnet and the first coil, and a second lens drive unit including a base disposed to be spaced apart from the first lens drive unit by a predetermined distance, a plurality of support members for supporting the housing while allowing the housing to move in second and third directions, perpendicular to the first direction, with respect to the base, a second coil disposed to face the first magnet, and a circuit board bonded to one surface of the base by means of an adhesive, so as to move the housing in the second and third directions by interaction between the first magnet and the second coil, wherein the base further includes a mounting recess in which a spring unit is disposed, the mounting recess including a stepped portion providing a space for accommodating an adhesive member.

Advantageous Effects

According to an embodiment, there is an effect of being able to enhance the coupling strength between a support member and a housing by forming a through hole in a region of the support member to which the housing is bonded, and bonding the support member to the housing by means of an adhesive.

In addition, according to an embodiment, there is an effect of providing a lens moving apparatus designed to inhibit a printed circuit board from being raised up from a base, and a camera module including the lens moving apparatus.

DESCRIPTION OF DRAWINGS

FIG. 1 is a perspective view illustrating a lens moving apparatus according to an embodiment;

FIG. 2 is an exploded perspective view illustrating the lens moving apparatus according to the embodiment;

FIG. 3 is a perspective view illustrating support members according to the embodiment, which is disposed on a housing;

FIG. 4 is a front view illustrating the support member according to the embodiment;

FIG. 5 is a front view illustrating the support member according to the embodiment, which is disposed on the housing;

FIG. 6 is an fragmentary perspective view illustrating the support member according to the embodiment, which is disposed on the housing;

FIG. 7 is a view illustrating an embodiment of portion A of FIG. 6;

FIG. 8 is a view illustrating another embodiment of portion A of FIG. 6;

FIG. 9 is a schematic perspective illustrating a lens moving apparatus according to another embodiment;

FIG. 10 is an exploded perspective view illustrating the lens moving apparatus according to the embodiment;

FIG. 11 is a view illustrating a base, a printed circuit board and second coils, according to the embodiment;

FIGS. 12a and 12b are views illustrating various embodiments of a stepped portion of the base of the lens moving apparatus according to the embodiment;

FIGS. 13a and 13b are view illustrating embodiments of the stepped portion of the lens moving apparatus according to the embodiment;

FIG. 14 is a view illustrating the second coils, the printed circuit board and the base of the lens moving apparatus according to the embodiment;

FIG. 15 is a perspective view of a portable device according to an embodiment; and FIG. 16 is a block diagram of the portable device shown in FIG. 15. FIG. 1 illustrates a top perspective view of a light-emitting element package according to an embodiment.

BEST MODE

Hereinafter, embodiments will be described with reference to the attached drawings. Since the embodiments may be altered in various ways, specific embodiments illustrated in the drawings will be described in detail. However, the embodiments should not be construed as being limited only to the specific embodiments set forth herein, but should be understood to cover all modifications, equivalents or alternatives falling within the idea and technical scope of the disclosure. The sizes and shapes of elements shown in the drawings may be exaggerated for clarity and convenience of explanation.

It will be understood that although the terms "first", "second", etc. may be used herein to describe various elements, these elements should not be limited by these terms. These terms are only used to distinguish one element from another element. In addition, it should be understood that terms that are particularly defined in consideration of construction and operation of the embodiments are intended to explain the embodiments and should not be construed as limiting the scope of the embodiments.

In the following description of the embodiments, it will be understood that, when an element is referred to as being formed "on" or "under" the another element, it can be directly "on" or "under" the other element, or can be indirectly disposed with one or more intervening elements therebetween. In addition, it will also be understood that "on" or "under" the element may mean an upward direction or a downward direction based on the element.

In addition, the relative terms "top/upper/above", "bottom/lower/under" and the like in the description and in the claims may be used to distinguish between any one substance or element and other substances or elements and are not necessarily intended to describe any physical or logical relationship between the substances or elements or a particular order.

For reference, in the respective drawings, a rectangular coordinate system (x, y, z) may be used. In the drawings, the x-axis and the y-axis indicate a plane perpendicular to the optical axis, and for convenience, the optical axis (z-axis) direction may be referred to as a first direction, the x-axis direction may be referred to as a second direction, and the y-axis direction may be referred to as a third direction.

An optical image stabilizing apparatus, which is applied to compact camera modules of mobile devices such as smart phones or tablet PCs, refers to an apparatus configured to inhibit the contour of an image captured upon still image shooting from not being clearly formed due to vibrations caused by the trembling of user's hand.

In addition, an autofocusing device is configured to automatically focus the subject image on the surface of an image sensor. The optical image stabilizing apparatus and the autofocusing device may be configured in various manners. The lens moving apparatus according to the embodiments may perform the optical image stabilizing and/or autofocusing operations in such a manner as to move an optical module composed of a plurality of lenses in a first direction or in a direction perpendicular to the first direction.

As shown in FIG. 2, the lens moving apparatus according to an embodiment may include a movable unit. The movable unit may fulfill the functions of autofocusing and handshake correction for a lens. The movable unit may include a bobbin 110, a first coil 120, first magnets 130, a housing 140, an upper elastic member 150 and a lower elastic member 160.

The bobbin 110 may be disposed in the first magnets 130, and may be provided on the outer circumferential surface thereof with the first coil. The bobbin 110 may be mounted so as to be reciprocated in a first direction in the internal space of the housing 140 by electromagnetic interaction between the first magnets 130 and the first coil 120. The first coil 120 may be provided on the outer surface of the bobbin 110 so as to electromagnetically interact with the first magnets 130.

The bobbin 110 may be moved in the first direction while being elastically supported by the upper and lower elastic members 150 and 160, thereby fulfilling the autofocusing function.

The bobbin 110 may include a lens barrel (not shown) into which at least one lens is mounted. The lens barrel may be internally coupled with the bobbin 110 in various manners.

In an example, the bobbin 110 may be provided on the inner surface thereof with a female threaded portion, and the lens barrel may be provided on the outer surface thereof with a male threaded portion corresponding to the female threaded portion, whereby the lens barrel may be coupled with the bobbin 110 by means of threaded engagement therebetween. However, the coupling between the lens barrel and the bobbin 110 is not limited thereto, and the lens barrel may be directly coupled with the inside of the bobbin 110 in a manner other than the threaded engagement, in which case the female threaded portion is not provided on the inner surface of the bobbin 110. Alternatively, one or more lenses may be integrally formed with the bobbin 110, without using the lens barrel.

The lens, which is coupled with the lens barrel, may be composed of a single lens, or two or more lenses constituting an optical system.

The autofocusing function may be controlled by changing the direction of current, or may be fulfilled by the action of moving the bobbin 110 in the first direction. For example, the bobbin 110 may be moved upward from its initial position upon the application of forward current, and may be moved downward upon the application of reverse current. The distance by which the bobbin 110 moves in one direction from the initial position may be increased or decreased by controlling the amount of current flowing in one direction.

The bobbin 110 may be provided on upper and lower surfaces thereof with a plurality of upper support protrusions and a plurality of lower support protrusions, respectively. The upper support protrusions may be configured to have a circular cylindrical shape or a rectangular column shape, and may serve to couple or secure the upper elastic member 150 thereto. The lower support protrusions may also be configured to have a circular cylindrical shape or a rectangular column shape, and may serve to couple or secure the lower elastic member 160 thereto, like the upper support protrusions.

The upper elastic member 150 may have therein through holes corresponding to the upper support protrusions, and the lower elastic member 160 may have therein through holes corresponding to the lower support protrusions. The respective support protrusions and the corresponding through holes may be fixedly coupled with each other by means of thermal fusion or an adhesive such as epoxy.

The housing 140 may function to support the first magnets 130. As shown in FIGS. 1 and 2, in an embodiment, the housing 140 may be configured to have a hollow column, for example, an approximately rectangular hollow column capable of supporting the first magnets 130. Each lateral side of the housing 140 may be provided with the first magnet 130 and support members 220 secured thereto.

As described above, the housing 140 may be provided therein with the bobbin 110, which is moved in the first direction under the guidance of the elastic members 150 and 160. In this embodiment, the first magnets 130 may be disposed at the corner regions of the housing 140, and the support members 220 may be disposed on the lateral side surfaces of the housing 140.

The upper elastic member 150 may be disposed on the bobbin 110, and the lower elastic member 160 may be disposed under the bobbin 110. The upper elastic member 150 and the lower elastic member 160 may elastically support the upward or downward movement of the bobbin 110 in the first direction. The upper elastic member 150 and the lower elastic member 160 may be constituted by a leaf spring.

As shown in FIG. 2, the upper elastic member 150 may be composed of a pair of elastic members, which are separated from each other. By virtue of the dual partitioning structure, current having different polarities or different electric powers may be applied to the respective partitioned elastic members of the upper elastic member 150. In a modification, the lower elastic member 160 may also be composed of a pair of partitioned elastic members, and the upper elastic member 150 may be configured to have an integral structure.

The upper elastic member 150, the lower elastic member 160, the bobbin 110 and the housing 140 may be assembled to one another by means of thermal fusion and/or bonding using an adhesive or the like. Here, the components may be first coupled with one another by means of thermal fusion, and may then be finally coupled with one another by means of bonding using an adhesive.

The base 210 may be disposed under the bobbin 110, and may be configured to have an approximately rectangular shape. A printed circuit board 250 may be mounted on the base 210, and lower portions of the support members 220 may be coupled with the base 210. The base 210 may be provided in the upper surface thereof with mounting grooves 214 into which the support members 220 are fitted. An adhesive may be applied to the mounting grooves 214 to immobilize the support members 220.

The regions of the base 210 that face terminal members 253 of the printed circuit board 250 may be provided with respective support recesses having a size corresponding to that of the terminal members 253. The support recesses may be recessed from the outer circumferential surface of the base 210 by a predetermined depth such that the terminal members 253 do not protrude outward from the outer circumferential surface of the base 210 or such that the extent to which the terminal members 253 protrude can be controlled.

The support members 220 are disposed on the lateral sides of the housing 140 such that the upper sides of the support members 220 are coupled with the housing 140 and the lower sides of the support members 220 are coupled with the base 210. The support members 220 may support the bobbin 110 and the housing 140 in such a manner as to allow the bobbin 110 and the housing 140 to move in the second and third directions, perpendicular to the first direction. The support members 220 may be conductively connected to the first coil 120.

The upper elastic member 150 may apply current to the first coil 120 through the support members 220 conductively connected thereto. Although the support members 220 are illustrated in FIG. 2 as being embodied as plate-shaped support members according to an embodiment, the support members 220 are not limited thereto. In other words, the support members 220 may be configured to have a wire shape.

Second coils 230 may move the housing 140 in the second and/or third directions to perform the handshake correction by virtue of electromagnetic interaction with the first magnets 130.

The second or third direction may include not only the x-axis direction and the y-axis direction but also a direction which is substantially close to the x-axis direction or the y-axis direction. In other words, in terms of driving in the embodiments, although a housing 140 may move in a direction parallel to the x-axis or the y-axis, the housing may move in a direction which is slightly oblique with respect to the x-axis or the y-axis in the state of being supported by a support member 220.

The first magnets 130 are required to be disposed at positions corresponding to the second coils 230.

The second coils 230 may be disposed so as to face the first magnets 130, which are secured to the housing 140. In one embodiment, the second coils 230 may be disposed outside the first magnets 130, or may be disposed under the first magnets 130 so as to be spaced apart from the first magnets 130 by a predetermined distance.

According to the embodiment, although a total of four second coils 230 may be disposed such that one thereof is disposed on each corner of a circuit member 231, the disclosure is not limited thereto. Only two second coils 230, that is, one second coil for movement in the second direction and one second coil for movement in the third direction, may be provided, or a total of more than four second coils 230 may be provided.

In the embodiment, although circuit patterns having the shape of the second coils 230 are formed on the circuit member 231 and additional second coils are disposed on the circuit member 231, the disclosure is not limited thereto. Alternatively, only additional second coils 230 may be disposed on the circuit member 231, without forming the circuit patterns having the shape of the second coils 230.

Furthermore, the second coils 230, which have been prepared by winding wires into a doughnut shape or which have the shape of a finely patterned coil, may be conductively connected to the printed circuit board 250.

The second coils 230 may be disposed over the base 210 and under the housing 140. The circuit member 231 including the second coils 230 may be disposed on the upper surface of the printed circuit board 250, which is positioned over the base 210.

However, the disclosure is not limited thereto, and the second coils 230 may be disposed on the base 210 in a state of being in close contact therewith, or may be spaced apart from the base 210 by a predetermined distance. In other examples, a substrate on which the second coils are formed may be layered on the printed circuit board 250 and connected thereto.

The printed circuit board 250 may be coupled with the upper surface of the base 210. As shown in FIG. 2, the printed circuit board 250 may have through holes or grooves formed at positions corresponding to the mounting grooves 214 so as to allow the mounting grooves 214 to be exposed therethrough.

The printed circuit board 250 may be provided with the terminal members 253, which are formed by bending portions of the printed circuit board 250 and to which the terminals 251 are attached. The embodiment illustrates the printed circuit board 250 having two bent terminal members 253. Each terminal member 253 includes a plurality of terminals 251 for the application of external power to the terminal members 253, whereby current is supplied to the first coil 120 and the second coils 230. The number of terminals 251 provided on each terminal member 253 may be increased or decreased depending on the kinds of components to be controlled. Alternatively, the number of terminal members 253 provided on the printed circuit board may be one, or three or more.

A cover member 300, which is configured to have an approximate box shape, may accommodate the movable unit, the second coils 230 and a portion of the printed circuit board 250, and may be coupled with the base 210. The cover member 300 may serve to protect the movable unit, the second coils 230, the printed circuit board 250 and the like, accommodated therein, from damage, and may serve to inhibit an electromagnetic field, which is generated by the first magnets 130, the first coil 120, the second coils 230 and the like, from leaking outward, thereby concentrating the electromagnetic field.

FIG. 3 is a perspective view illustrating the support members 220 according to an embodiment of the present invention. FIG. 4 is a front view illustrating the support member 220 according to the embodiment.

The support member 220 may be coupled at an upper portion thereof to the upper elastic member 150. The support member 220 may also be coupled at another upper portion thereof to the housing 140.

As illustrated in FIG. 3, the support member 220 according to the embodiment may be disposed on a side surface of the housing 140. The support member 220 may be coupled with the mounting groove 214 formed in the base 210 by means of an adhesive or the like, and may be bonded at an upper side thereof to a side surface of the housing 140 and to the upper elastic member 150.

Since the support members 220 are respectively disposed on the outer surfaces of the cuboidal housing 140, a total of four support members may be symmetrically disposed so as to surround the bobbin 110. However, the disclosure is not limited thereto, and a total of eight support members 220 may also be disposed two on each side surface of the housing 140.

The support member may be conductively connected to the upper elastic member 150, or may be conductively connected to a straight surface of the upper elastic member 150. Since the support member 220 is prepared separately from the elastic member 150, the support member 220 may be conductively connected to the upper elastic member 150 by means of a conductive adhesive, solder or the like.

As illustrated in FIG. 4, the support member 220 may include a first coupling portion 221, a first elastic deformation portion 222, a second elastic deformation portion 223, a second coupling portion 224, a connecting portion 225 and a first protruding portion 226.

The first coupling portion 221 may be coupled with an upper portion of the housing 140, and may be provided with through holes 800 formed therethrough. The first coupling portion 221 may be bonded at the region of the through holes 800 to a second protruding portion 149 protruding from the upper surface of the housing 140. The first coupling portion 221 may also be bonded to the upper elastic member 150, and detailed description thereof will be given later.

As illustrated in FIG. 4, at least one through hole 800 may be formed in opposite ends of the first coupling portion 221. By applying an adhesive to the through holes 800, the first coupling portion 221 may be bonded to the housing 140. The structure in which the first coupling portion 221 is coupled with the housing 140 will be described in detail later.

In another embodiment, the second coupling portion 224 may be provided with a recess (not shown), and the housing 140 may be provided with a coupling protrusion (not shown). Accordingly, by fitting the coupling protrusion into the recess, the second coupling portion 224 may be coupled with the housing 140.

The second coupling portion 224 may be the portion that is coupled with the base 224, and may be provided at the lower end of the support member 220. The second coupling portion 224 may be configured to have a plate shape having a width larger than the width of the first elastic deformation portion 222 and the second elastic deformation portion 223. However, the disclosure is not limited thereto, and second coupling portion 224 may have a width smaller than or equal to the width of the first elastic deformation portion 222 and the second elastic deformation portion 223.

According to the embodiment, as illustrated in FIG. 4, the second coupling portion 224 may be composed of a pair of coupling portions, which are connected to each other and diametrically opposed and which are respectively fitted or disposed in the mounting grooves 214 in the base 210. The second coupling portion 224 may be fixedly coupled with the mounting groove 214 formed in the base 210 by means of an adhesive such as epoxy. Alternatively, the second coupling portion 224 may be coupled with the base 210 without the mounting groove 214.

However, the disclosure is not limited thereto, and the second coupling portion 224 may be coupled with the mounting groove 214 merely by fitting the second coupling portion 224 into the mounting groove 214 in an interference fitting manner. The second coupling portion 224 may be a single coupling portion, or may be composed of two or more coupling portions. In this case, the base 210 may be provided with the mounting groove 214 in a number corresponding to the number of second coupling portion 224.

The first elastic deformation portion 222 may be composed of a pair of elastic deformation portions, which extend from the first coupling portion 221 and are diametrically opposed. The second elastic deformation portion 223 may be composed of a pair of elastic deformation portions, which extend from the second coupling portion 224 and are diametrically opposed.

Each of the first and second elastic deformation portions 222 and 223 may be configured to have a predetermined pattern, which is prepared by bending the elastic deformation portions at least once. According to the embodiment, the elastic deformation portions may include the first and second elastic deformation portions 222 and 223. The first elastic deformation portion 222 extends from the first coupling portion 221 so as to be connected to the connecting portion 225. The second elastic deformation portion 223 extends from the first coupling portion 221 so as to be connected to the connecting portion 225.

The first and second elastic deformation portions may be disposed with the connecting portion 225 interposed therebetween, and may be configured to have shapes corresponding to each other.

In an example, when the first elastic deformation portion 222 is configured to have a zigzag shape by bending the elastic deformation portion 222 two times or more as illustrated in FIG. 4, the second elastic portion 223 may be configured to have a corresponding zigzag shape. However, the disclosure is not limited thereto, and only the first elastic deformation portion 222 may be provided or the second elastic deformation portion 223 may be configured to have a different shape.

The above configuration is merely an example, and the elastic deformation portions may be configured to have various other shapes. The elastic deformation portions may be constructed into a single elastic deformation portion without division into the first and second elastic deformation portions 222 and 223, and may be configured to have suspension wire shapes without the bent pattern.

According to the embodiment, the straight portions of the first and second elastic deformation portions 222 and 223 may be disposed so as to be approximately parallel to a plane perpendicular to the first direction.

When the housing 140 is moved in the second and/or third direction along a plane perpendicular to the first direction, the first and second elastic deformation portions 222 and 223 may be elastically deformed to a minute extent in a direction in which the housing 140 moves or in the longitudinal direction of the support member 220.

As a result, the housing 140 is able to move in the second and third directions defining a plane perpendicular to the first direction with almost no displacement in the first direction, thereby improving the accuracy of the handshake correction. The improvement is obtained by employing the ability of the elastic deformation portions 222 and 223 to be extensible in the longitudinal direction. Here, the longitudinal direction may be a direction in which the first coupling portion 221 is connected to the second coupling portion 224.

The connecting portion 225 may be composed of a pair of connecting portions, which connect the first and second elastic deformation portions 222 and 223 to each other and which are disposed to be diametrically opposed to each other. The connecting portion 225 may be disposed between the first and second elastic deformation portions 222 and 223, as described above. However, the disclosure is not limited thereto, and the connecting portion 225 may be connected to only one of the first and second elastic deformation portions 222 and 223.

In the embodiment, although each of the first and second elastic deformation portions 222 and 223 is composed of a pair of elastic deformation portions, each of the first and second coupling portions 221 and 224 is integrally formed, and is able to couple both the first and second elastic deformation portions 222 and 223 to the housing 140 and the base 210.

Each of opposite ends of the support member 220 may be provided with one or more coupling portions, and one or more elastic deformation portion may be provided between the support members 220.

The first protrusion 226 may protrude downward from the first coupling portion 221. Although the first protruding portion 226 is illustrated in FIG. 4 as having a T-shape, the disclosure is not limited thereto. For example, the first protruding portion 226 may be configured to have various shapes, such as a bar shape, a circular shape, an elliptic shape and a curved shape.

The first protrusion 226 may be bonded to a lateral side surface of the housing 140 so as to function to fix or couple an upper portion of the support member 220 to a lateral side surface of the housing 140. Here, if only the first protrusion 226 is bonded to the housing 140 in order to bond the support member 220 to the housing 140, it is impossible to provide sufficient coupling strength between the support member 220 and the housing 140.

In this case, the support member 220 may be separated from the housing 140 due to the repeated application of external shocks, thereby causing malfunction or breakage of the lens moving apparatus. Hence, there is a problem in that it is impossible to assure the mechanical reliability of the lens moving apparatus. A specific structure of the lens moving apparatus capable of overcoming this problem will be described later.

FIG. 5 is a front view illustrating the support member 220 according to the embodiment of the present invention. FIG. 6 is a partial perspective view illustrating the support member 220 according to the embodiment.

The first protruding portion 226 of the support member 220 may be bonded to the lateral side surface of the housing 140. The lateral side surface of the housing 140 may be provided at a region thereof corresponding to the first protruding portion 226 with a fourth protruding portion 147, which is to be bonded to the first protruding portion 226. The fourth protruding portion 147 may protrude in a direction toward the first protruding portion 226.

Accordingly, an adhesive may be applied to the opposing surfaces of the first protruding portion 226 and the fourth protruding portion 147. As the adhesive is cured, the first protruding portion 226 may be bonded to the fourth protruding portion 147, whereby the support member 220 is bonded to the housing 140.

The region of the lateral side surface of the housing 140, at which the support member 220 is disposed, may be formed into an inclined surface 148. As illustrated in FIG. 6, the inclined surface 148 may be configured to have a surface area capable of accommodating the entire support member 220.

The inclined surface 148 may be formed by depressing a portion of the lateral side surface of the housing 140 that corresponds to a surface area capable of accommodating the entire support member 220. Here, the depressed region of the lateral side surface of the housing 140 may be configured such that the distance between the housing 140 and the support member 220 is increased moving downward.

In other words, due to the formation of the inclined surface 148, the distance between the lateral side surface of the housing 140 and the support member 220 may be increased moving downwards. By virtue of this configuration, when the support member 220 moves along an x-y plane perpendicular to the first direction, interference between the housing 140 and the support member 220 may be remarkably reduced, thereby improving the handshake correction function of the lens moving apparatus.

FIG. 7 is an enlarged view illustrating portion A of FIG. 6. As described above, the second protruding portion 149 may protrude from the upper surface of the housing 140 in the first direction, and an end of the first coupling portion 221, in which the through holes 800 are formed, may be bonded to the second protruding portion 149. Referring to FIG. 7, the process of bonding the first coupling portion 221 to the second protruding portion 149 will now be described.

First, an adhesive is applied to opposing surfaces of an end of the first coupling portion 221 and the second protruding portion 149. Subsequently, the end of the first coupling portion 221 is bonded to the second protruding portion 149, and an adhesive is further applied to the opposite surface 221b of the end of the first coupling portion 221.

Thereafter, as the adhesive is cured, the opposing surfaces of the end of the first coupling portion 221 and the second protruding portion 149 may be bonded or coupled with each other by means of the adhesive. At this time, after curing of the adhesive, adhesive trapped in the through holes 800 and adhesive on the opposite surface 221b may serve as a fastening element, such as a fixing pin, a rivet or the like.

Consequently, by virtue of the bonding structure using an adhesive, the first coupling portion 221 and the second protruding portion 149 may be firmly fixed or coupled with each other. As a result, the support member 220 and the housing 140 may also be firmly coupled with each other.

In another embodiment, an adhesive may be applied only to the opposite surface 221b of the end of the first coupling portion 221, which is positioned opposite the opposing surface of the end of the first coupling portion 221. In this case, since a portion of the adhesive applied to the opposite surface 221b infiltrates between the opposing surfaces of the end of the first coupling portion 221 and the second protruding portion 149 through the through holes 800, the opposing surfaces may be fixed or coupled with each other by the infiltrated adhesive.

Accordingly, according to the embodiment, the through holes 800 are formed through the region of the first coupling portion 221 of the support member 220 that is bonded to the housing 140, and the support member 220 and the housing 140 are adhesively coupled with each other by means of an adhesive. Consequently, there is an effect of being able to increase the coupling strength between the support member 220 and the housing 140.

The first coupling portion 221 may be bonded to the upper elastic member 150. As illustrated in FIG. 7, a bonding portion 900 may be provided in order to bond the first coupling portion 221 and the upper elastic member 150 to each other.

The bonding portion 900 may function to couple the first coupling portion 221 and the upper elastic member 150 to each other by being applied or formed between a portion of the first coupling portion 221 and the upper elastic member 150.

In an embodiment, the bonding portion 900 may be applied or formed so as to bond a portion of the opposing surface of the end of the first coupling portion 221 that faces the second protruding portion 149, the side surface of the second protruding portion 149 and the upper surface of the elastic member, as illustrated in FIG. 7.

The bonding portion 900 may be applied or formed into a three-dimensional shape, such as a portion of a sphere or an oval sphere. This shape of the bonding portion 900 may be easily realized by using the viscosity and surface tension of the adhesive constituting the bonding portion 900.

The support member 220 and the upper elastic member 150 may be made of a metal material. Meanwhile, the bobbin 110 may be made of a plastic material.

Coupling between components made of the same material using an adhesive may remarkably enhance the coupling strength between the components, compared to coupling between components made of different materials using an adhesive.

In the embodiment, the support member 220 and the bobbin 110 made of a plastic material are coupled with each other using an adhesive, and the support member 220 and the upper elastic member 150, both of which are made of a metal material, are coupled with each other using an adhesive.

Accordingly, since the support member 220 and the upper elastic member 150, which are made of the same material, particularly, a metal material, are coupled with each other using an adhesive, the coupling strength of the support member 220 to the lens moving apparatus may be remarkably increased.

Consequently, the embodiment may remarkably reduce malfunction or breakage of the lens moving apparatus, which is caused by low coupling strength of the support member 220 and consequent separation of the support member 220 from the housing 140 due to the repeated application of external shocks. As a result, there is an effect of being able to secure the mechanical reliability of the lens moving apparatus.

FIG. 8 is a view illustrating another embodiment of portion A of FIG. 6. In this embodiment, the upper elastic member 150 may be provided with a third protruding portion 159 at a region thereof facing the lower end of the first coupling portion 221, as illustrated in FIG. 8.

In this embodiment, the third protruding portion 159 and the first coupling portion 221 may be bonded to each other in the following manner. First, an adhesive is applied to the opposing surfaces of the end of the first coupling portion 221 and the second protruding portion 149, or is applied only to the opposite surface of the end of the first coupling portion 221 that is positioned opposite the opposing surface of the end of the first coupling portion 221.

Subsequently, a portion of the adhesive applied to the first coupling portion 221 flows to the third protruding portion 159 and stays there. In the embodiment, the adhesive flowing from the first coupling portion 221 may be trapped between the upper surface 159a of the third protruding portion 159 and the lower end 221a of the first coupling portion 221.

The adhesive which has flowed from the first coupling portion 221 and has then been trapped between the upper surface 159a of the third protruding portion 159 and the lower end 221a of the first coupling portion 221 may couple the first coupling portion 221 to the upper elastic member 150.

In the embodiment, the first coupling portion 221 and the first protruding portion 226 may be coupled with each other by means of the adhesive, and, at the same time, the first coupling portion 221 and the third protruding portion 159 may also be coupled with each other by means of the adhesive. In addition, the first coupling portion 221, the second protruding portion 149 and the upper elastic member 150 may be coupled with one another by means of the bonding portion 150.

In the embodiment, a secure triple bond is established among the support member 220, the bobbin 110 and the upper elastic member 150, and the support member 220 is coupled with the lateral side surface of the bobbin 110. By virtue of this multiple bonding structure, the support member 220 may be firmly coupled with the lens moving apparatus.

In the embodiment, the adhesive that is used or the bonding portion 900 may be composed of epoxy or thermosetting bond. However, the disclosure is not limited thereto, and any material may be used as long as the material satisfies coupling strength and other properties required in design of the lens moving apparatus.

The lens moving apparatus according to the embodiment may be incorporated in devices in various fields, for example, a camera module. Such a camera module may be applied to mobile devices such as cellular phones.

The camera module according to the embodiment may include the lens barrel coupled with the bobbin 110, an image sensor (not shown), and a printed circuit board. The lens barrel may be configured as described above, and the printed circuit board 250 may define the bottom surface of the camera module from a portion thereof on which the image sensor is mounted. The lens barrel may include at least one lens for transmitting an image to the image sensor.

The camera module may further include an infrared-screening filter (not shown). The infrared-screening filter serves to shield the image sensor from light in an infrared range.

The base 210 shown in FIG. 2 may include the infrared-screening filter mounted at a position corresponding to the image sensor, and may be coupled with a holder member (not shown). The holder member may support a lower side of the base 210.

The base 210 may be provided with an additional terminal member for connection with the printed circuit board 250, and the terminal member may also be integrally formed using a surface electrode.

The base 210 may serve as a sensor holder for protecting the image sensor. In this case, although the base 210 may be provided along the lateral side surface thereof with protrusions that project downward, these are not essential components. Although not shown in the drawings, an additional sensor holder disposed under the base 210 may fulfill the same function as the protrusions.

FIG. 9 is a schematic perspective view illustrating a lens moving apparatus according to another embodiment. FIG. 10 is an exploded perspective view illustrating the lens moving apparatus shown in FIG. 9.

Referring to FIG. 9, the lens moving apparatus according to the embodiment may include a first lens moving unit (not shown), a second lens moving unit (not shown) and a cover member 1300. Here, the first lens moving unit 100 may fulfill the function of the above-described autofocusing device, and the second lens moving unit 200 may fulfill the function of the above-described handshake correction device.

The cover member 1300 may be configured to have an approximate box shape, and may surround the first and second lens moving units (not shown).

As shown in FIG. 10, the lens moving apparatus according to the embodiment may include a movable unit. The movable unit may fulfill the autofocusing and handshake correction functions of the lens. The movable unit may include a bobbin 1110, a first coil 1120, first magnets 1130, a housing 1140, an upper elastic member 1150 and a lower elastic member 1160.

The bobbin 1110 may be provided on the outer surface thereof with the first coil 1120 disposed between the first magnets 1130. Due to the electromagnetic interaction between the first magnets 1130 and the first coil 1120, the bobbin 1110 may reciprocate in the first direction in the space inside the housing 1140. The bobbin 1110 may be provided on the outer surface thereof with the first coil 1120 so as to electromagnetically interact with the first magnets 1130.

The bobbin 1110 may move in the first direction in the state of being elastically supported by the upper elastic member 1150 and the lower elastic member 1160 in order to fulfill the autofocusing function.

The bobbin 1110 may include a lens barrel (not shown) in which at least one lens is mounted. The lens barrel may be coupled with the inside of the bobbin 1110 in various ways.

For example, the lens barrel may be coupled with the bobbin 1110 in such a manner as to form a female thread in the inner surface of the bobbin 1110, form a male thread, corresponding to the female thread, in the outer surface of the lens barrel and threadedly engage the two components with each other. However, the disclosure is not limited thereto, and the lens barrel may be directly held in the bobbin 1110 in ways other than the threaded engagement, without formation of the thread in the inner surface of the bobbin 1110. Alternatively, the at least one lens may be integrally formed with the bobbin without having to prepare the lens barrel.

The lens coupled with the lens barrel may be composed of a single lens or two or more lenses constituting an optical system.

The autofocusing function may be controlled by changing the direction of current, or may be fulfilled by the action of moving the bobbin 1110 in the first direction. For example, the bobbin 1110 may be moved upward from its initial position upon the application of forward current, and may be moved downward upon the application of reverse current. The distance by which the bobbin 1110 moves in one direction from the initial position may be increased or decreased by controlling the amount of current flowing in one direction.

The bobbin 1110 may be provided on upper and lower surfaces thereof with a plurality of upper support protrusions and a plurality of lower support protrusions, respectively. The upper support protrusions may be configured to have a circular cylindrical shape or a rectangular column shape, and may serve to couple or secure the upper elastic member 1150 thereto. The lower support protrusions may also be configured to have a circular cylindrical shape or a rectangular column shape, and may serve to couple or secure the lower elastic member 1160 thereto, like the upper support protrusions.

The upper elastic member 1150 may be disposed on the bobbin, and the lower elastic member 1160 may be disposed under the bobbin 1110. The upper elastic member 1150 may have through holes corresponding to the upper support protrusions, and the lower elastic member 1160 may have through holes corresponding to the lower support protrusions. The respective support protrusions and the corresponding through holes may be fixedly coupled with each other by means of thermal fusion or an adhesive such as epoxy.

The housing 140 may be configured to have a hollow column, for example, an approximately rectangular hollow column capable of supporting the first magnets 1130. Each lateral side of the housing 1140 may be provided with the first magnet 1130 and support members 1220 secured thereto.

As described above, the housing 1140 may be provided therein with the bobbin 1110, which is moved in the first direction under the guidance of the elastic members 1150 and 1160. In this embodiment, the first magnets 1130 may be disposed at the corner regions of the housing 1140, and the support members 1220 may be disposed on the lateral side surfaces of the housing 1140.

The upper elastic member 1150 and the lower elastic member 1160 may elastically support the upward and/or downward movement of the bobbin 1110 in the first direction. The upper elastic member 1150 and the lower elastic member 1160 may be constituted by a leaf spring.

As shown in FIG. 10, the upper elastic member 1150 may be composed of a pair of elastic members, which are separated from each other. By virtue of this dual partitioning structure, current having different polarities or different electric powers may be applied to the respective partitioned elastic members of the upper elastic member 1150. In a modification, the lower elastic member 1160 may also be composed of a pair of partitioned elastic members, and the upper elastic member 1150 may be configured to have an integral structure.

The upper elastic member 1150, the lower elastic member 1160, the bobbin 1110 and the housing 1140 may be assembled to one another by means of thermal fusion and/or bonding using an adhesive or the like. Here, the components may be first coupled with one another by means of thermal fusion, and may then be finally coupled with one another by means of bonding using an adhesive.

The base 1210 may be disposed under the bobbin 1110, and may be configured to have an approximately rectangular shape. A printed circuit board 1250 may be mounted on the base 1210, and lower portions of the support members 1220 may be coupled with the base 1210. The base 1210 may be provided in the upper surface thereof with mounting grooves 1214 into which the support members 1220 are fitted. An adhesive may be applied to the mounting grooves 1214 so as to immobilize the support members 1220.

The regions of the base 1210 that face terminal members 1253 of the printed circuit board 1250 may be provided with respective support recesses having a size corresponding to that of the terminal members 1253. The support recesses may be recessed from the outer circumferential surface of the base 1210 by a predetermined depth such that the terminal members 1253 do not protrude outward from the outer circumferential surface of the base 1210 or such that the extent to which the terminal members 1253 protrude can be controlled.

The support members 1220 are disposed on the lateral sides of the housing 1140 such that the upper sides of the support members 1220 are coupled with the housing 1140 and the lower sides of the support members 1220 are coupled with the base 1210. The support members 1220 may support the bobbin 1110 and the housing 1140 in such a manner as to allow the bobbin 1110 and the housing 1140 to move in the second and third directions, perpendicular to the first direction. The support members 1220 may be conductively connected to the first coil 1120.

Since the support members 1220 according to the embodiment are respectively disposed on the outer surfaces of the cuboidal housing 1140, a total of four support members may be symmetrically disposed. However, the disclosure is not limited thereto, and a total of eight support members 1220 may alternatively be disposed two on each side surface of the housing 1140. The support members 1220 may be conductively connected to the upper elastic member 1150, or may be conductively connected to a straight surface of the upper elastic member 1150.

Since the support member 1220 is prepared separately from the elastic member 1150, the support member 1220 may be conductively connected to the upper elastic member 1150 by means of a conductive adhesive, solder or the like. Consequently, the upper elastic member 1150 may apply current to the first coil 1120 through the support members conductively connected thereto.

Although the support members 1220 are illustrated in FIG. 10 as being embodied as plate-shaped support members according to an embodiment, the support members 1220 are not limited thereto. In other words, the support members 1220 may be configured to have a wire shape.

Second coils 1230 may move the housing 1140 in the second and/or third directions to perform the handshake correction by virtue of electromagnetic interaction with the first magnets 1130.

The second or third direction may include not only the x-axis direction or the y-axis direction but also a direction which is substantially close to the x-axis direction or the y-axis direction. In other words, in terms of driving in the embodiments, although a housing 1140 may move in a direction parallel to the x-axis or the y-axis, the housing may move in a direction which is slightly oblique with respect to the x-axis or the y-axis in the state of being supported by a support member 1220.

The first magnets 1130 are required to be disposed at positions corresponding to the second coils 1230.

The second coils 1230 may be disposed so as to face the first magnets 1130, which are secured to the housing 1140. In one embodiment, the second coils 1230 may be disposed outside the first magnets 1130, or may be disposed under the first magnets 1130 so as to be spaced apart from the first magnets 1130 by a predetermined distance.

According to the embodiment, although a total of four second coils 1230 may be disposed one on each corner of a circuit member 1231, the disclosure is not limited thereto. Only two second coils 1230, that is, one second coil for movement in the second direction and one second coil for movement in the third direction, may be provided, or a total of more than four second coils 1230 may be provided.

In the embodiment, although circuit patterns having the shape of the second coils 1230 are formed on the circuit member 1231 and additional second coils are disposed on the circuit member 1231, the disclosure is not limited thereto. Alternatively, only additional second coils 1230 may be disposed on the circuit member 1231, in which case the circuit patterns having the shape of the second coils 1230 are not formed.

Furthermore, the second coils 1230, which have been prepared by winding wires into a doughnut shape or which have the shape of a finely patterned coil, may be conductively connected to the printed circuit board 1250.

The second coils 1230 may be disposed over the base 1210 and under the housing 1140. The circuit member 1231 including the second coils 1230 may be disposed on the upper surface of the printed circuit board 1250, which is positioned over the base 1210.

However, the disclosure is not limited thereto, and the second coils 1230 may be disposed on the base 1210 in a state of being in close contact therewith, or may be spaced apart from the base 1210 by a predetermined distance. In other examples, a substrate on which the second coils are formed may be layered on the printed circuit board 1250 and connected thereto.

The printed circuit board 1250 may be coupled with the upper surface of the base 1210. As shown in FIG. 10, the printed circuit board 1250 may have through holes or grooves formed at positions corresponding to the mounting grooves 1214 so as to expose the mounting grooves 1214 therethrough.

The printed circuit board 1250 may be provided with the terminal members 1253, which are formed by bending portions of the printed circuit board 1250 and to which the terminals 1251 are attached. The embodiment illustrates the printed circuit board 1250 having two bent terminal members 1253. Each terminal member 1253 includes a plurality of terminals 1251 for the application of external power to the terminal members 1253, whereby current is supplied to the first coil 1120 and the second coils 1230. The number of terminals 1251 provided on each terminal member 1253 may be increased or decreased depending on the kinds of components to be controlled. Alternatively, the number of terminal members 1253 provided on the printed circuit board may be one, or three or more.

A cover member 1300, which is configured to have an approximate box shape, may accommodate the movable unit, the second coils 1230 and a portion of the printed circuit board 1250, and may be coupled with the base 1210. The cover member 1300 may serve to protect the movable unit, the second coils 1230, the printed circuit board 1250 and the like, accommodated therein, from damage, and may serve to inhibit an electromagnetic field, which is generated by the first magnets 1130, the first coil 1120, the second coils 1230 and the like, from leaking outward, thereby concentrating the electromagnetic field.

FIG. 11 is an exploded perspective view illustrating the base 1210, the printed circuit board 1250 and the second coils 1230, according to the embodiment. The lens moving apparatus may further include position sensors 1240.

The position sensors 1240 are disposed at the center of the second coils 1230 so as to detect movement of the housing 1140. Here, the position sensors 1240 may basically detect movement of the housing 1140 in the first direction. In some cases, the position sensors 1240 may be configured so as to detect movement of the housing 1140 in the second and third directions.

The position sensors 1240 may be embodied as hall sensors or the like, but may alternatively be embodied as any sensor as long as the sensor is able to detect variation in magnetic force. As illustrated in FIG. 11, a total of two position sensors 1240 may be mounted on the corner regions of the base 1210 disposed under the printed circuit board 1250. The mounted position sensors 1240 may be received in a position sensor mounting recess 1215 formed in the base 1210. The lower surface of the printed circuit board 1250 may be the surface opposite the surface on which the second coils 1230 are disposed.

The position sensors 1240 may be disposed to be spaced downward apart from the second coils 1230 with the printed circuit board 1250 interposed therebetween. Specifically, the position sensors 1240 are not directly connected to the second coils 1230. The second coils 1230 may be disposed on the upper surface of the printed circuit board 1250 whereas the position sensors 1240 may be disposed on the lower surface of the printed circuit board 1250.

The lens moving apparatus according to the embodiment may be incorporated in devices in various fields, for example, a camera module. Such a camera module may be applied to mobile devices such as cellular phones.

The camera module according to the embodiment may include the lens barrel coupled with the bobbin 1110 and an image sensor (not shown). The lens barrel may include at least one lens for transmitting an image to the image sensor.

The camera module may further include an infrared-screening filter (not shown). The infrared-screening filter serves to shield the image sensor from light in an infrared range.

The base 1210 shown in FIG. 10 may include the infrared-screening filter mounted at a position corresponding to the image sensor, and may be coupled with a holder member (not shown). The holder member may support the lower side of the base 1210.

The base 1210 may be provided with an additional terminal member for connection with the printed circuit board 1250, and the terminal member may also be integrally formed using a surface electrode.

The base 1210 may further include an adhesive member 1211 for bonding the printed circuit board 1250 to the base 1210.

The adhesive member 1211 may be provided on one side surface of the base 1210. The adhesive member 1211 may be disposed at a position at which one side surface of the base 1210 contacts one side surface of the printed circuit board 1250 in a surface-contact manner, as illustrated in the drawing.

Although the adhesive member 1211 is illustrated as being disposed on one side surface of the base 1210 in the embodiment, an additional adhesive member 1211 may be further provided on the side surface opposite the side surface on which the base adhesive member 1211 is provided.

The adhesive member 1211 shown in the embodiment is merely one embodiment, and any element capable of bonding the printed circuit board 1250 to the base 1210 may be used. The scope of rights of the present invention is not limited as to the position or the number of adhesive members 1211.

The base 1210 may further include an adhesive-member-receiving portion (not shown) which provides a space for accommodating the adhesive member 1211.

The adhesive-member-receiving portion (not shown) is depressed from one surface of the base by a predetermined height so as to provide a space for accommodating the adhesive member 1211.

The adhesive-member-receiving portion (not shown) is required only in order to provide a space for accommodating the adhesive member 1211, and is not limited to the above embodiment. Furthermore, the adhesive-member-receiving portion does not limit the scope of rights of the present invention.

The base 1210 may further include a stepped portion provided in a mounting recess 1214 in which a spring unit (not shown) is disposed.

As described above, the adhesive member 1211 may be provided on one surface of the base 1210 in order to bond the printed circuit board 1250 to the base 1210. Here, if the amount of the adhesive member 1211 is insufficient, the adhesive force between the base 1210 and the printed circuit board 1250 is decreased, thereby causing a phenomenon whereby the printed circuit board 1250 is raised from the base 1210. Meanwhile, if the amount of the adhesive member 1211 is greater than the correct amount, the adhesive member 1211 flows into the mounting recess, thereby causing a problem in which it is difficult to accurately couple a spring unit (not shown) to the mounting recess 1214.

Hence, the embodiment further includes the stepped portion provided in the mounting recess 1214 of the base 1210 in order to inhibit the adhesive member 1211 from flowing into the mounting recess 1214.

The stepped portion may include at least one side surface portion 12143 defining a side surface of the stepped portion, a lower surface portion 12142 defining the lower surface of the stepped portion and a stepped space 12141 defined by the side surface portion 12143 and the lower surface portion 12142 so as to receive the adhesive member 1211.

The lower surface portion 12142 of the stepped space 12141 may have a linear cross-sectional shape.

Alternatively, the lower surface portion 12142 of the stepped space 12141 may have a curved cross-sectional shape that is convex in the first direction.

In this case, since the cross-sectional shape of the lower surface portion 12142 of the stepped space 12141 is convex in the first direction perpendicular to the lower surface portion 12142, the adhesive member 1211 is collected at opposite sides of the lower surface portion 12142, thereby providing an effect of being able to efficiently inhibit the adhesive member 1211 from flowing into the mounting recess 1214.

Furthermore, the lower surface portion 12142 of the stepped space 12141 may also have a curved cross-sectional shape that is concave in the first direction perpendicular to the lower surface portion 12142.

In this case, since the cross-sectional shape of the lower surface portion 12142 of the stepped space 12141 is concave in the first direction perpendicular to the lower surface portion 12142, the adhesive member 1211 is collected at the center of the lower surface portion 12142, thereby providing an effect of being able to efficiently inhibit flow of the adhesive member 1211 into the mounting recess 1214.

In addition, the lower surface portion 12142 of the stepped space 12141 may also have a sine curve shape.

In this case, since the cross-sectional shape of the lower surface portion 12142 of the stepped space 12141 is concave at multiple points in the first direction perpendicular to the lower surface portion 12142, the adhesive member 1211 is collected in multiple recesses of the lower surface portion 12142, thereby providing an effect of being able to efficiently inhibit the flow of the adhesive member 1211 into the mounting recess 1214.

Although the stepped portion is illustrated as being composed of a single stepped portion in the embodiment, the stepped portion may include a plurality of stepped portions.

By the provision of the plurality of stepped portions, the size of a space capable of accommodating the adhesive member 1211 is at least doubled or tripled. Consequently, there is an effect of being able to efficiently inhibit the adhesive member 1211 from flowing into the mounting recess 1214.

The lower surface portion 12142 may further include a plurality of protrusions 12144.

The plurality of protrusions 12144 may protrude upward from the lower surface portion 12142 by a predetermined height.

Since the provision of the plurality of protrusions 12144 to the lower surface portion 12142 increases resistance to the flow of the adhesive member 1211 introduced into the stepped portion, it is possible to efficiently inhibit the adhesive member 1211 introduced into the stepped portion from flowing into the mounting recess 1214.

Although the plurality of protrusions 12144 are illustrated in the drawing as having a hemisphere shape, the illustration is merely one embodiment, and the protrusions 12144 may be formed into a conical shape or a polygonal column.

The base 1210 may serve as a sensor holder for protecting the image sensor. In this case, although the base 1210 may be provided along the lateral side surface thereof with protrusions that project downward, these are not essential components. Although not shown in the drawings, an additional sensor holder disposed under the base 210 may fulfill the same function as the protrusions.

Referring to FIG. 14, the second coils 1230 may include fifth through holes 1230a that are formed through the corner portions of the circuit member 1231. The support members 1220 may be connected to the printed circuit board 1250 through the fifth through holes 1230a. When the second coils 1230 are finely patterned (FP) coils, optical image stabilizer (OIS) coils 1232 may be formed or disposed on some portions of the finely patterned coils. In addition, the fifth through holes 1230a may not be formed in the second coils 1230, and the support members 1220 may be conductively soldered to the points of the second coils 1230 at which the fifth through holes 1230a would otherwise be formed.

FIG. 15 is a perspective view illustrating a portable device 200A according to an embodiment. FIG. 16 is a view illustrating the configuration of the portable device 200A shown in FIG. 15.

Referring to FIGS. 15 and 16, the portable device 200A (hereinafter referred to as a "device") may include a body 850, a wireless communication unit 710, an audio/video (A/V) input unit 720, a sensing unit 740, an input/output unit 750, a memory unit 760, an interface unit 770, a controller 780, and a power supply unit 790.

A variety of electronic components of the device may be mounted in the space defined between the front case 851 and the rear case 852.

The wireless communication unit 710 may include a broadcast receiving module 711, a mobile communication module 712, a wireless Internet module 713, a near field communication module 714, and a location information module 715.

The A/V input unit 720 serves to input audio signals or video signals, and may include, for example, a camera 721 and a microphone 722.

The camera 721 may be a camera including the lens moving apparatus 100 according to the embodiment.

The sensing unit 740 may sense the current state of the device 200A, such as, for example, the opening or closing of the device 200A, the location of the device 200A, the presence of a user's touch, the orientation of the device 200A, or the acceleration/deceleration of the device 200A, and may generate a sensing signal to control the operation of the device 200A. In addition, the sensing unit 740 serves to sense, for example, whether power is supplied from the power supply unit 790, or whether the interface unit 770 is coupled with an external component.

The input/output unit 750 serves to generate, for example, visual, audible, or tactile input or output. The input/output unit 750 may generate input data to control the operation of the device 200A, and may display information processed in the device 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals.

The sound output module 752 may output audio data received from the wireless communication unit 710 in, for example, a call signal receiving mode, a call mode, a recording mode, a voice recognition mode, or a broadcast receiving mode, or may output audio data stored in the memory unit 760.

The touchscreen panel 753 may convert variation in capacitance, caused by a user's touch on a specific region of a touchscreen, into electrical input signals.

The memory unit 760 may store programs for the processing and control of the controller 780, input/output data, images captured by the camera 721 and the like.

The interface unit 770 may receive power or data from the external component, and may transmit the same to respective constituent elements inside the device 200A, or may transmit data inside the device 200A to the external component. The controller 780 may control the general operation of the device 200A. The controller 780 may include a panel controller 144 of a touchscreen panel drive unit shown in FIG. 1, or may fulfill the function of the panel controller 144.

The controller 780 may include a multimedia module 781 for multimedia playback. The controller 780 may perform pattern recognition processing, by which writing or drawing, input to a touchscreen is perceived as characters and images respectively.

The power supply unit 790 may supply power required to operate the respective constituent elements upon receiving external power or internal power under the control of the controller 780.

Although embodiments have been described with reference to a number of illustrative embodiments thereof, it should be understood that numerous other modifications and embodiments can be devised. The technical contents of the above-described embodiments may be combined in various manners as long as they are not incompatible with each other, and new embodiments may be realized through such combination thereof.

INDUSTRIAL APPLICABILITY

In the embodiments, the through holes are formed in the regions of the first coupling portion of the support member, which are bonded to the housing, and the support member is coupled with the housing by means of an adhesive. Accordingly, there is an effect of being able to increase the coupling strength between the support member and the housing, thereby being industrially applicable.

What is claimed is:

1. A lens moving apparatus comprising:
a housing;
a bobbin disposed in the housing;
a magnet disposed on the housing;
a first coil disposed on the bobbin and configured to move the bobbin in a first direction by an interaction with the magnet;
an upper elastic member coupled to an upper portion of the bobbin;
a base disposed under the bobbin;
a circuit member disposed on the base and comprising a second coil facing the magnet;
a support member coupled to the upper elastic member and configured to support the housing; and
a terminal member disposed on the base,
wherein the support member comprises a coupling portion electrically connected to the terminal member, and
wherein the coupling portion of the support member is positioned lower than the circuit member.

2. The lens moving apparatus according to claim 1, wherein the circuit member is disposed on an upper surface of the base.

3. The lens moving apparatus according to claim 1, wherein the coupling portion of the support member is positioned lower than the second coil.

4. The lens moving apparatus according to claim 1, wherein the second coil is formed in the circuit member.

5. The lens moving apparatus according to claim 1, wherein the support member and the upper elastic member are coupled with a conductive adhesive.

6. The lens moving apparatus according to claim 1, comprising a first position sensor and a second position sensor disposed on the base and disposed below the circuit member.

7. The lens moving apparatus according to claim 6, wherein the base comprises a first recess for receiving the first position sensor and a second recess for receiving the second position sensor.

8. The lens moving apparatus according to claim 1, wherein the support member is conductively connected to the circuit member through the terminal member.

9. The lens moving apparatus according to claim 1, wherein the second coil comprises a coil pattern formed at the circuit member.

10. The lens moving apparatus according to claim 1, comprising a lower elastic member coupled to a lower portion of the bobbin.

11. The lens moving apparatus according to claim 1, wherein the support member comprises a wire shape.

12. The lens moving apparatus according to claim 1, wherein the support member is conductively connected to the first coil.

13. The lens moving apparatus according to claim 12, configured such that a current is applied to the first coil through the upper elastic member and the support member.

14. The lens moving apparatus according to claim 1, wherein the support member and the upper elastic member are made of a metal material.

15. The lens moving apparatus according to claim 1, wherein the support member comprises four support members disposed to be symmetrical to each other.

16. The lens moving apparatus according to claim 13, wherein the upper elastic member comprises two elastic members.

17. The lens moving apparatus according to claim 1, wherein the first coil is disposed on an outer surface of the bobbin.

18. A lens moving apparatus comprising:
a housing;
a bobbin disposed in the housing;

a magnet disposed on the housing;

a first coil disposed on the bobbin and configured to move the bobbin in a first direction by an interaction with the magnet;

an upper elastic member coupled to an upper portion of the bobbin;

a base disposed under the bobbin;

a circuit member disposed on the base and comprising a second coil facing the magnet;

a support member coupled to the upper elastic member and configured to support the housing; and a terminal member disposed on the base, wherein the support member comprises a coupling portion electrically connected to the terminal member, and wherein the coupling portion of the support member is positioned lower than the second coil.

19. A camera module comprising:

a lens;

the lens moving apparatus according to claim 1; and an image sensor.

20. The lens moving apparatus according to claim 18, wherein the circuit member is disposed on an upper surface of the base and the second coil comprises a coil pattern formed at the circuit member.

* * * * *